INVENTOR
JAMES H. GODFREY
KESTUTIS DAMIJONAITIS

BY Lindsey, Crutzman and Hayes
ATTORNEYS

Nov. 3, 1964   J. H. GODFREY ETAL   3,155,128
PORTABLE RECIPROCATING SAW
Filed Sept. 29, 1961   4 Sheets-Sheet 2
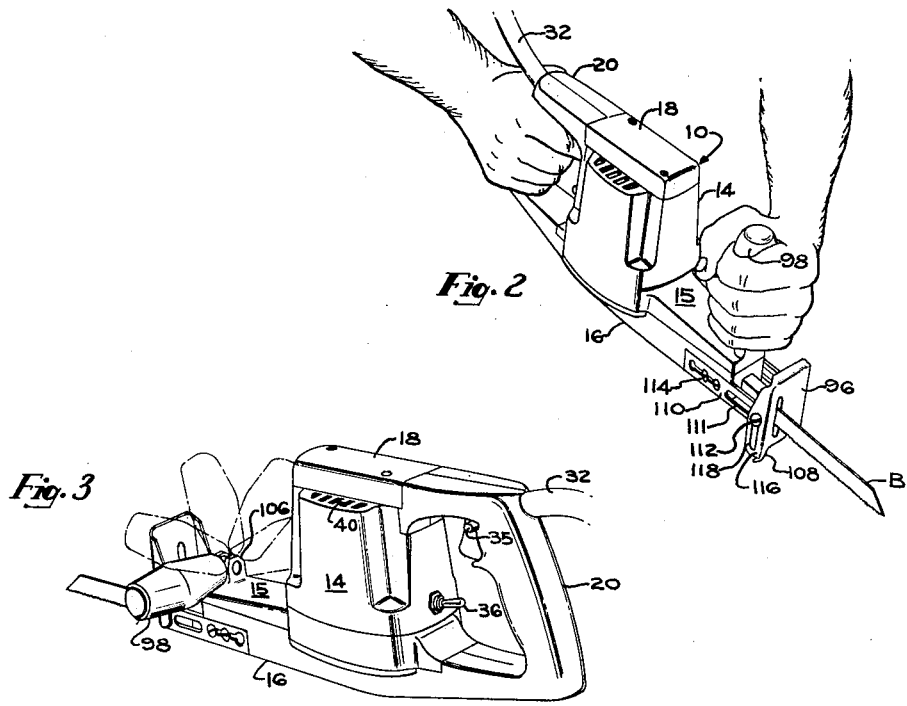
Fig. 2
Fig. 3
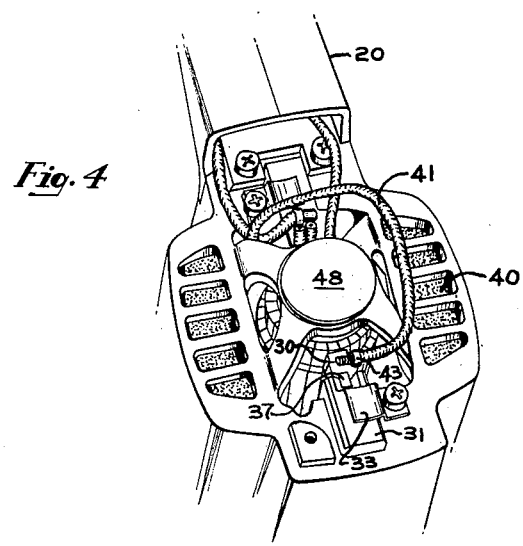
Fig. 4
INVENTOR
JAMES H. GODFREY
KESTUTIS DAMIJONAITIS
BY *Lindsey, Bretzman and Hayes*
ATTORNEYS

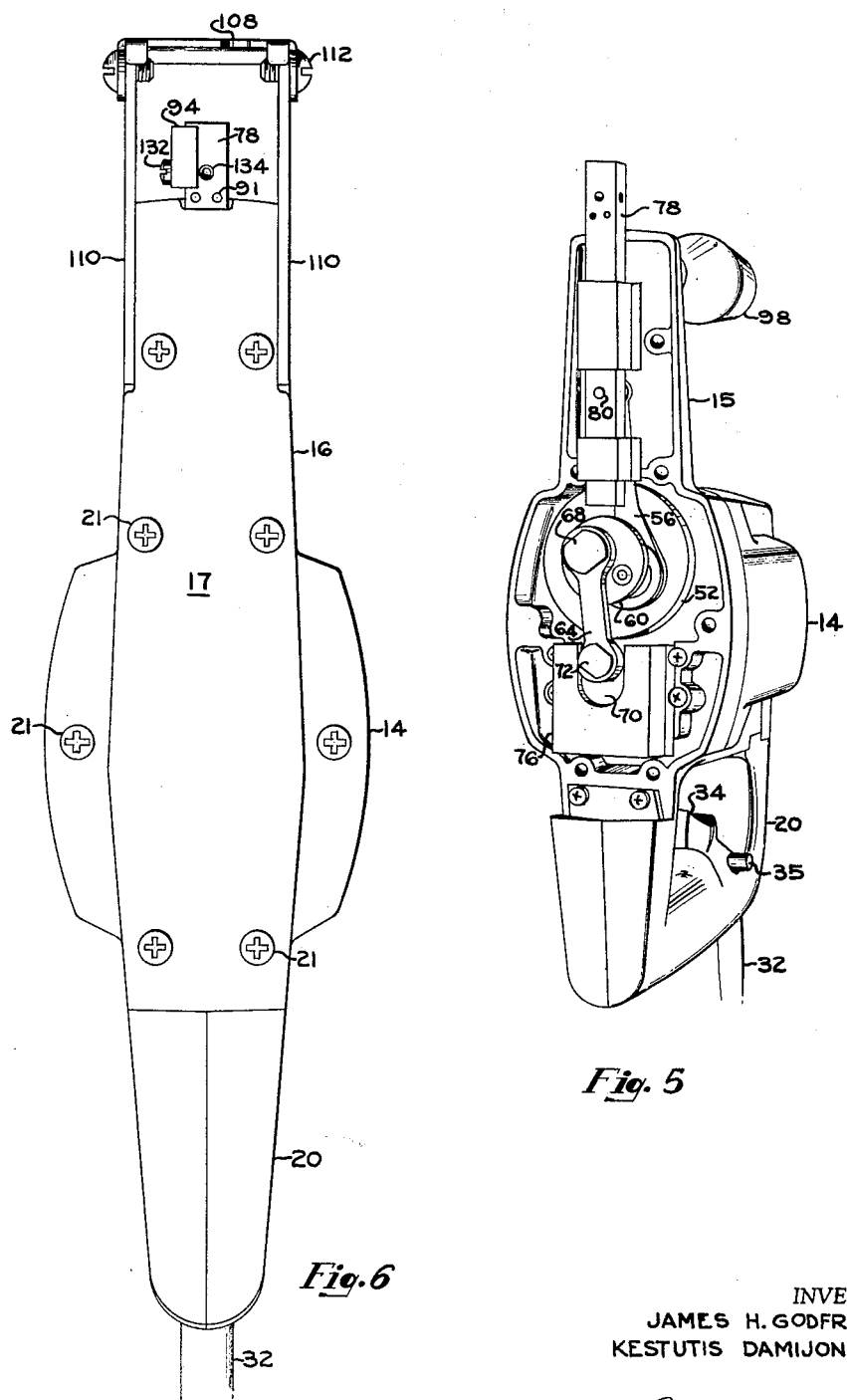

Nov. 3, 1964    J. H. GODFREY ETAL    3,155,128
PORTABLE RECIPROCATING SAW
Filed Sept. 29, 1961    4 Sheets-Sheet 4

INVENTOR
JAMES H. GODFREY
KESTUTIS DAMIJONAITIS

BY *Lindsey, Pratzman and Hayes*

ATTORNEYS

United States Patent Office 3,155,128
Patented Nov. 3, 1964

3,155,128
PORTABLE RECIPROCATING SAW
James H. Godfrey, Berlin, and Kestutis Damijonaitis, Newington, Conn., assignors to The Stanley Works, New Britain, Conn., a corportion of Connecticut
Filed Sept. 29, 1961, Ser. No. 141,836
3 Claims. (Cl. 143—68)

This invention relates to improvements in portable saws and, more particularly, to a portable electric powered reciprocating saw adaptable for universal usage.

It is highly desirable in accomplishing skilled operations of carpentry, plumbing, air conditioning or furnace installation, sheet metal fabrication and the like to have a portable saw which can be adapted, without additional attachments, for all of the cutting jobs encountered in carrying out such skilled operations. Accordingly, it is an object of this invention to provide an all-purpose multispeed, reciprocating saw adaptable for multi-directional cutting including flush-cutting as well as standard cutting and plunge cutting of wood, conduit, insulation board, metal, plywood, plastics, etc. Flush cutting is highly useful in cutting into existing construction to provide openings where a cut is required with one edge flush with a wall, floor or the like.

It is an additonal object of this invention to provide a lightweight vibration-free portable saw, and further provide for the saw components to be convenient and such that the best working position and confined quarters are comfortable and also provide for safety features so that the saw is safe to use.

An additional object of this invention is to provide for ease and accessibility for maintenance so that the portable saw may be maintained or repaired when necessary with little difficulty.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

FIG. 2 is a perspective view of the saw showing its use for one type of cutting;

FIG. 3 is a perspective view of a portable saw illustrating the various possible positions which an auxiliary front handle may assume;

FIG. 4 is a top perspective view of the motor commutator and the brush holders for the motor with a portion of the saw housing removed illustrating the ease of accessibility and replacement of certain components;

FIG. 5 is a bottom perspective view of the saw with a portion of the saw housing removed illustrating the counter-weighted reciprocating saw drive plunger;

FIG. 6 is a bottom plan view of the saw housing together also showing a guard shoe and blade mounting arrangement;

Figure 1:
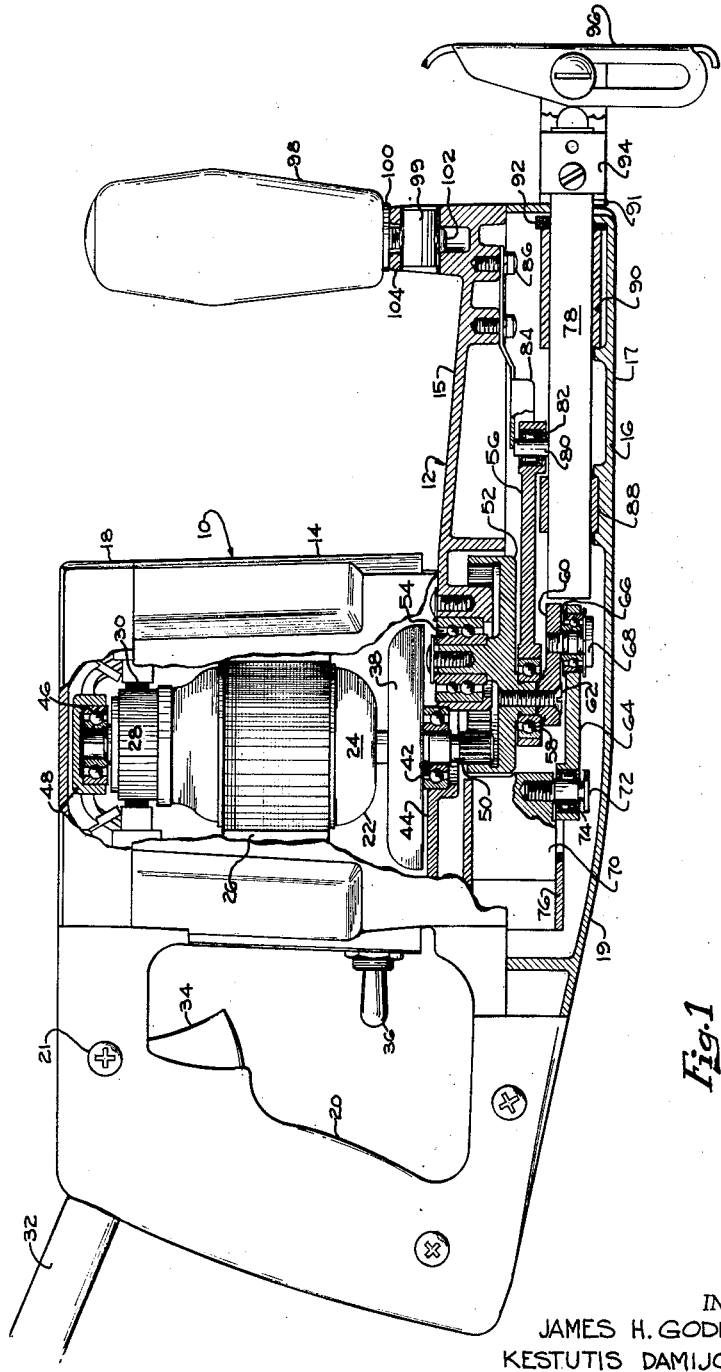
FIG. 1 is a side elevation view, partially broken away and partially in section of the improved portable all-purpose reciprocating saw which is the subject of this invention.

Referring to the drawings, in FIG. 1 there is shown a saw assembly 10 with portions of an enclosing housing 12 broken away for the sake of clarity. The housing 12 includes a number of components, such as, a motor housing 14, a gear housing 15, a plunger housing 16 with a flat bottom portion 17, a motor housing cover 18, and a split switch handle housing 20 providing an upright spade handle rearwardly of the motor housing. Bottom portion 17 includes an inclined rear portion 19 and all of the housing components are rigidly held together by suitable cap screws 21, see FIGS. 2 and 3 for example.

The saw is powered by a two-speed electric motor 22 vertically mounted within motor housing 14, which motor includes a rotary armature 24, stationary field pieces 26 and a commutator 28 contacted by motor brushes 30. Electric power is supplied to the motor from any suitable source through electrical conductor cord 32, then through on-off trigger switch 34 and two-speed motor speed selector switch 36. The trigger switch 34 includes a locking pin 35, FIGS. 3 and 5. It is noted that the electric cord 32 joins the switch handle housing 20 at the top thereof so that it is out of the way and conveniently located to remain clear of the work area yet is positioned over an operator's hand to assist in preventing the tool from accidentally slipping from his grasp, see FIG. 2. The location of the two-speed switch 36 is convenient for fingertip operation, while the trigger switch 34 with locking pin 35 control gives full control of motor operation. The handle housing 20 is contoured for a firm steady grip in the most natural operating position and is slanted upwardly relative to a saw blade, somewhat similar to the grip handle of a hand saw. The motor 22 also includes a fan 38 for ventilating the motor through the ventilating holes 40 in the top of the motor housing 14, as shown in FIGS. 3 and 4.

The motor armature 24 is rotatably journaled and supported by an armature ball bearing 42 supported in casting socket 44 in gear housing 15 at the fan end of the armature, and by armature bearing 46 supported by a spider-connected cap 48 at the commutator end of the armature. The top end of the motor support cap 48 may be seen clearly in FIG. 4.

Also as shown in FIG. 4, the motor 22 and brushes 30 therefor are easily accessible after the motor housing cover 18 is removed giving the operator a view of the motor as shown in FIGURE 4. The brushes 30 are mounted in brush holders 31 which in turn, are clamped to the housing by simple single screw clamps 33. The brush holders include a window 37 providing for ease in checking the brush wear without removing the brushes from the holders. If a brush biasing spring (not shown) on the inner edge of the carbon brush 30 is visible through the window 37, the brush should be changed. Thus, the brushes 30 and the commutator 28 can both be inspected with only the motor housing cover 18 removed and even with the motor operating. The brush leads 41 are connected to the brush holders 31 by a simple clip 43; hence, there are no brush caps which could heat up or become damaged.

The drive connection from the motor 22 is by means of an armature pinion 50 integral with the armature shaft, which pinion is in mesh with a crank gear 52, an internal cup-shaped ring gear shown in FIG. 1 as having a sufficient mass to act as a flywheel for the motor drive. The crank gear 52 is rotatably journaled by an anti-friction bearing 54 supported in a boss in gear housing 15. A downward projection or eccentric on crank gear 52 provides the drive for a connecting rod 56 which is journaled thereon by means of an anti-friction rod bearing 58. A crank 60 is connected to the crank gear 52 by screw 62 and is positioned below the connecting rod 56. A counterweight connecting rod 64 is driven by crank 60 and is journaled thereto by an anti-friction bearing 66 positioned around a stud shaft 68. A counterweight 70 is connected to connecting rod 64 by means of a bearing shaft 72 and anti-friction bearing 74. The counterweight 70 reciprocates in a bushing 76 provided therefor. The reciprocating drive and counterbalancing system are clearly shown in FIG. 5.

A reciprocating drive plunger 78 which is square in cross section includes a rigidly attached pin 80 connected thereto furnishing a pin for the driving connection from connecting rod 56. A roller bearing 82 rotatably journals the connecting rod 56 to pin 80 providing the drive from the connecting rod 56 to the plunger 78. A guide 84 is provided for the pin end of connecting rod 56 and this guide is secured to the gear housing 15 by screws 86 as shown in FIGURE 1. The plunger 78 is slidably supported by an inner bushing 88 and an outer bushing 90, which bushings in turn are located by bosses in the inner bottom of the plunger housing 16 and by a felt 92 in front of the outer bushing 90. Stop pins 91 are provided on the underside of the plunger 78 outside of the housing. It is noted that the bottom edge of the plunger 78 is only slightly above the plane of the flat bottom 17 of plunger housing 16, thus a plunger-carried saw blade will be substantially flush with the bottom of the housing.

A blade clamp 94 is attached to the plunger 78 for clamping a saw blade in various positions thereto for accomplishing the sawing action and a shoe 96 is secured to plunger housing 16. The blade clamp 94 and the shoe 96 will both be described in detail hereinafter with an explanation of the multiple functions and uses of the saw.

The counterbalancing system including counterweights 70 and the anti-friction ball and needle bearings 42, 54, 58, 66, 74, and 82 function to provide vibration-free operation of the reciprocating parts. That is, the weight of the plunger and corresponding moving parts are counterbalanced by the counterweight system resulting in very smooth operation.

An auxiliary handle 98 adapted to assume a number of positions is provided adjacent the front end of the saw for grasp by an operator's hand as illustrated in FIG. 2. The auxiliary handle 98 includes a pivot pin 99, FIG. 1, operating in a hole in an extension 104 of the gear housing 15. The handle 98 includes a washer 100 between the handle and the housing extension 104 and also includes an extending stud 102 for threaded connection into pivot pin 99. By unscrewing the handle 98, the pivot pin will be loosened so that the handle may be moved about the axis of pin 99. As shown in FIG. 3, the housing extension 104 includes five flat surfaces 106 for cooperation with washer 100. By loosening the handle 98, unscrewing the screw 102, the handle may be moved to any one of the five positions shown in phantom lines and the screw retightened to rigidly hold the handle in place by holding the washer 100 against the particular one of the five flat surfaces 106. This adjustment of the auxiliary handle 98 is quite desirable for use of the saw in a number of different positions and for a number of different types of cutting with different blade mountings.

As shown for example in FIG. 2, the shoe 96 includes a shoe plate 108 which is spaced from the saw 10 by shoe brackets 110 which are adjustably secured to the plunger housing 16 by means of screws 114 so that the distance of the shoe 96 from the front of the plunger housing 16 can be adjustably varied. This feature of moving the shoe 96 in and out by adjustment of brackets 110 results in longer life of a saw blade B as two different sections of the blade may be utilized for the cutting depending upon the distances of the shoe 96 from the plunger housing 16. It is noted for completeness that slots 111 are provided in brackets 110 to permit access to the blade clamp 94 mounting screw.

Figure 7:
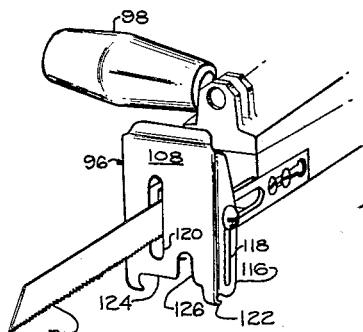
FIG. 7 is a perspective view illustrating the shoe and blade of the saw with the blade mounted downwardly adapted for plunge cutting or standard cutting.
Figure 10:
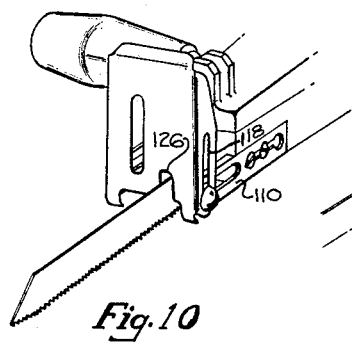
FIG. 10 is a perspective view illustrating another type of blade mounting together with another position of the shoe for downward flush cutting.

The shoe plate 108 includes rearwardly turned flanges 116 with vertical slots 118 therein so that the shoe may be positioned in a "down" position in the slots relative to the shoe brackets 110 as shown in FIGS. 2 and 7, or in an "up" position in the slots 118 with regard to the brackets 110 as shown in FIG. 10, for example.

Figure 9:
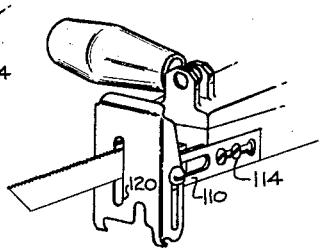
FIG. 9 is a perspective view similar to FIG. 7 with the blade mounted for upward cutting.
Figure 12:
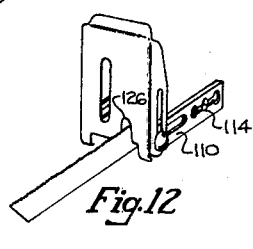
FIG. 12 is a perspective view showing the shoe in uppermost position and upward blade mounting.
Figure 13:
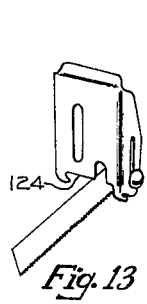
FIG. 13 is a perspective illustration of the blade and shoe mounted in position for left horizontal flush cutting.
Figure 15:
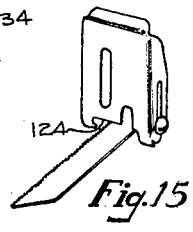
FIG. 15 is a perspective view illustrating the blade mounted for right horizontal flush cutting.

The shoe plate 108 also includes a vertical slot 120 in the front face thereof for enclosing a saw blade B and operating as a guard and guide therefor as shown in FIGS. 7 and 9. In addition, the front face of shoe plate 108 includes bottom in-turned feet 122 which function as a fulcrum point for plunge cutting. A horizontal relieved or recessed edges portion 124 in shoe plate 108 allows for side-flush mounting of the blade as shown in FIGS. 13 and 15; and the shoe plate also includes a vertical relief 126 for mounting of the blades vertically as shown in FIGS. 10 and 12.

Figure 8:
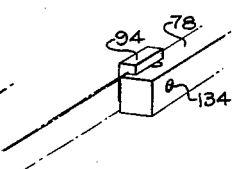
FIG. 8 is a perspective view illustrating the blade mounting clamp for mounting the blade as in FIG. 7 or FIG. 9.
Figure 11:
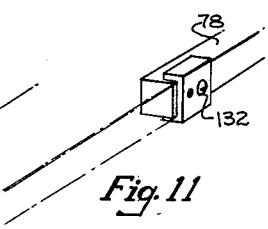
FIG. 11 is a perspective view showing the blade clamp for mounting the blade as shown in FIGS. 10 or 12.
Figure 14:
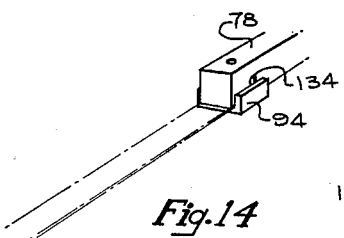
FIG. 14 is a perspective view of the blade clamp mounting for the blade as shown in FIGS. 13 or 15.
Figure 16:
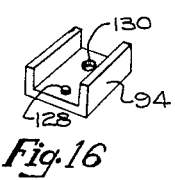
FIG. 16 is a perspective view of the blade clamp per se.

The blade clamp 94 is shown in detail in FIG. 16 and as shown is generally channel-shaped for fitting over the edges of the square end plunger 78, see FIGS. 8, 11, and 14. The blade clamp includes a small hardened locating pin 128 and a screw hole 130 for insertion of a screw 132 therethrough into a threaded hole 134 in plunger 78 for securing the blade in any position desired. This arrangement prevents the blade B from pulling out of the clamp during sawing operations.

Of course, a large number of different types of saw blades may be used with the saw and these blades all include a small hole in the shank thereof for fitting over locating pin 128 and holding the blade in reference position while the screw 132 also clamps the blade. As can be seen in FIGS. 8, 11 and 14, a saw blade B may be mounted on either of the side faces or the bottom face of plunger 78. Further, as can be seen in FIGS. 7, 9, 10, 12, 13 and 15, the cutting edge of the saw can face either direction when secured in any one of the three posititons, thus making a total of six different saw mounting positions. The saw mounting positions combined with the various positions of shoe 96 and the multiple positions which handle 98 may assume, as well as the two speeds of the motor 22, allow the saw to be adapted for multi-purpose use.

The saw is operated by closing the trigger switch 34 on handle 20 after the desired motor speed has been selected by operating the two-speed toggle switch 36. The operator graps the saw as illustrated in FIG. 2 and with the blade mounted on plunger 78 by means of blade clamp 94 and may begin cutting. The rotation of motor 22 drives the plunger 78 in a reciprocating manner through the crank gear 52 and connecting rod 56 and the reciprocations of plunger shaft 78 are balanced by the counterweight 70 and associated connecting parts.

For illustrating the various uses of the saw, reference may be had to FIGURES 7–15. The saw is constructed to flush cut to any vertical or horizontal surface without additional attachments. Such flush cutting is especially desirable for cutting vertically up or down the wall flush to the floor or ceiling or flush cuts horizontally left to right, parallel with the floor or ceiling plane of an existing building construction. Such cuts would be made, for example, when cutting out for ventilating ducts, heating or air conditioning systems, doors, windows, etc. For flush cutting vertically to a plane flush with the floor or ceiling, a blade would be mounted on the plunger 78 as shown in FIGS. 10 and 11 with the cutting surface downwardly and the shoe 96 in its uppermost position. The blade B would extend through vertical relief portion 126 in shoe plate 108 and the bottom of the shoe plate will be substantially flush with the bottom of the saw housing. By moving the saw downwardly, until the flat bottom surface 17 of plunger housing 16 abuts the floor, the cutting surface of blade B will also be substantially flush with the floor, thus allowing the cut to be accomplished vertically downwardly to the plane of the floor. This is possible due to the fact that the bottom cutting surface of he blade is substantially flush or in the same plane with the bottom surface of the flat plunger housing 16. It is noted that inclining surface 17 as at 19 permits rocking of the housing relative to the floor, for example, to facilitate accurate termination of the cut.

For making flush cuts, either left or right on a plane parallel with the flush floor for example, the blade B would be mounted as shown in FIGS. 13 and 15 depending on whether the cut was to be to the left or to the right. With the mounting of the blade on the bottom surface of the plunger 78 as shown in FIG. 14, the plane of the blade is substantially parallel to the plane of the bottom surface of the housing 16. Thus, by placing the bottom flat surface of plunger housing 16 on the floor or other surface where it is desired to make a flush cut and by starting the saw blade into the work, then moving the saw 10 either to the left or to the right, a flush cut may be made flush with the bottom of the saw and flush with the plane the saw is resting upon. The shoe 96 should be held firmly against the work.

For cutting vertically upward, a saw blade may be mounted either as shown in FIG. 9 or FIG. 12 on either side of the plunger 78 with the guard 96 in either the up or down position as shown in FIGS. 9 and 12, respectively. Further, the guard may be moved in or out by its attachments on brackets 110 by means of screws 114 to allow more or less of the blade teeth to be exposed.

For standard cutting, the blade B may be mounted as illustrated in FIG. 7 and the saw operated in a normal manner. For a plunge cutting, the shoe 96 is tightened in the down position as shown in FIG. 7, and the feet 122 are used as a support. The saw is tipped forwardly until the tip of the blade B is resting upon the work at the place to be cut and the trigger switch is operated while the saw is slowly pivoted downwardly and frontwardly about the feet 122 until the tip of the blade B begins to penetrate and cut the work. After the blade B completely penetrates the work, the saw may be moved vertical until the blade is perpendicular to the work. During all of the cutting operations, needless to say, the multi-position handle 98 may be adjusted to provide, in any of the most convenient of its five handle positions, for the surest grip and the best leverage in the particular position the saw is being used.

Thus, an extremely versatile portable reciprocating saw has been disclosed for sawing in practically any position. The saw is operable for flush cutting either down to or parallel with a flush plane, is further adapted for plunge cutting and has a unique two-position shoe for operating in the various multi-directions of the cutting. The two speeds of the electric motor allow for use on a wide variety of materials and the multi-position auxiliary handle provides for the best leverage in all uses. Smooth vibration-free power is accomplished by the counterweighted construction providing good stability. The switch handle and auxiliary handle construction allow for comfortable and natural use by an operator, whether he be a plumber, carpenter, air condition or furnace installer, sheet metal fabricator, electrician, general repairman or hobbyist. Furthermore, the multi-directional cutting including flush cutting allows an operator to work in the most difficult cutting position with a minimum of time and effort.

As will be apparent to persons skilled in the art, various modifications and adaptations of the structure above described will become readily apparent without departure from the spirit and scope of the invention, the scope of which is defined in the appended claims.

We claim:

1. A portable reciprocating saw adapted for multipurpose use comprising a housing having a substantially flat bottom portion, a drive motor mounted within the housing, a forwardly extending plunger mounted for reciprocable movement within the housing adjacent the bottom thereof, means providing a driving connection between the motor and plunger, means for securing a saw blade to the plunger for extension forwardly of the housing along the axis of movement of the plunger in a plane extending substantially perpendicular to the flat bottom of the housing and with a cutting edge of the blade extending substantially in the plane of the flat bottom of the housing, a generally upstanding saw blade shoe mounted forwardly on the housing, said shoe being provided with an upwardly extending slot from the lower edge thereof for receiving in a first position thereof the saw blade with the lower edge of the shoe substantially in the plane of the cutting edge of the blade, said shoe being further slotted for receiving in a second position thereof the saw blade with the lower edge of the shoe substantially below the cutting edge of the blade, means providing adjustment of the saw blade shoe substantially perpendicular to the plane of the flat bottom of the housing for adjusting the shoe between said first and second positions to provide for flush cutting with the lower edge of the shoe substantially in the plane of the cutting edge of the blade and plunger cutting with the lower edge of the shoe substantially below the cutting edge of the blade to provide a fulcrum for the saw, a forward handle mounted on the housing, and an upright spade handle connected to the housing rearwardly thereof and extending substantially in the plane of the saw blade whereby the forward handle and upright spade handle provide firm support for controlling the movement of the saw blade in its cutting plane and in a plane extending laterally thereof.

2. A portable reciprocating saw adapted for multipurpose use including multidirectional cutting comprising a housing having a substantially flat bottom portion, a drive motor mounted within the housing, a forwardly extending plunger mounted for reciprocable movement in the housing adjacent the bottom thereof, means providing a driving connection between the motor and plunger, means for securing a saw blade to the plunger for extension forwardly of the housing along the axis of movement of the plunger in a plurality of angularly related planes including first and second mutually perpendicular planes parallel and perpendicular respectively to the plane of the flat bottom of the housing and with a cutting edge of the blade substantially in the plane of the flat bottom of the housing, a generally upstanding saw blade shoe mounted forwardly on the housing, said shoe being provided with an upwardly extending slot from the lower edge thereof for receiving in a first position thereof the saw blade in both of said angularly related mutually perpendicular planes and with the lower edge of the shoe substantially in the plane of the cutting edge of the blade, said shoe being further slotted for receiving in a second position thereof the saw blade when mounted to extend in said second of the mutually perpendicular planes and with the lower edge of the shoe substantially below the cutting edge of the blade, means providing adjustment of the saw blade shoe substantially perpendicular to the plane of the bottom of the housing for adjusting the shoe between said first and second positions a forward handle mounted on the housing, and an upright spade handle connected to the housing rearwardly thereof and extending substantially in said second of the mutually perpendicular planes whereby the saw blade can be secured to the plunger for flush cutting in either of two mutually perpendicular planes or for plunge cutting using the lower edge of the saw blade shoe as a fulcrum.

3. A portable reciprocating saw adapted for multipurpose use including multidirectional cutting comprising a generally L-shaped housing including an upright portion and a forwardly extending portion having a substantially flat bottom, a drive motor mounted within the upright portion of the housing, a forwardly extending plunger mounted for reciprocable movement in the forwardly extending portion of the housing, means providing a driving connection between the motor and plunger, means for securing a saw blade to the plunger for extension forwardly of the housing along the axis of movement of the plunger in a plurality of angularly related planes including first and second mutually perpendicular planes parallel and perpendicular respectively to the plane of the flat bottom of the housing and with a cutting edge of the blade substantially in the plane of the flat bottom of the housing, a generally upstanding saw blade shoe mounted forwardly on the housing, said shoe being provided with an upwardly extending slot from the lower edge thereof for receiving in a first position thereof the saw blade in both of said mutually perpendicular planes and with the lower edge of the shoe substantially in the plane of the cutting edge of the blade, said shoe being further slotted for receiving in a second position thereof the saw blade when mounted to extend in said second of the mutually perpendicular planes and with the lower edge of the shoe substantially below the cutting edge of the blade, means providing adjustment of the saw blade shoe substantially perpendicular to the plane of the bottom of the housing for adjusting the shoe between said first and second positions, a forward handle mounted on the forwardly extending portion of the housing, means for positioning the forward handle to a number of different rigid positions according to the particular cutting action of the saw blade, and an upright spade handle connected to the housing rearwardly of the upright portion thereof and extending substantially in said second of the mutually perpendicular planes whereby with the saw blade mounted on the plunger for extension in either of said mutually perpendicular planes one of the spade handle and forward handle provides a firm support for controlling the movement of the saw blade in its cutting plane and the other of the spade handle and forward handle provides firm support for controlling the movement of the saw laterally of its cutting plane.

References Cited in the file of this patent
UNITED STATES PATENTS

| | | |
|---|---|---|
| 992,218 | Leland | May 16, 1911 |
| 2,477,150 | Snyder et al. | July 26, 1949 |
| 2,534,001 | Couse | Dec. 12, 1950 |
| 2,548,411 | Vache | Apr. 10, 1951 |
| 2,705,980 | Papworth | Apr. 12, 1955 |
| 3,028,890 | Atkinson et al. | Apr. 10, 1962 |

FOREIGN PATENTS

| | | |
|---|---|---|
| 208,301 | Switzerland | Apr. 16, 1940 |